United States Patent [19]
Rayfield

[11] 3,731,276
[45] May 1, 1973

[54] RETRIEVAL CODE

[75] Inventor: Harry F. Rayfield, Bradbury, Calif.

[73] Assignee: Terminal Data Corporations, Van Nuys, Calif.

[22] Filed: May 19, 1971

[21] Appl. No.: 144,960

[52] U.S. Cl. ......................340/146.3 Z, 235/61.11 E
[51] Int. Cl. ..............................................G06k 9/18
[58] Field of Search ................340/146.3 Z, 146.3 A; 235/61.11 E, 61.12 N; 209/111.7; 283/7

[56] References Cited

UNITED STATES PATENTS 3,257,545 6/1966 Van Berkel et al. ...........340/146.3 Z

*Primary Examiner*—Maynard R. Wilbur
*Assistant Examiner*—Leo H. Boudreau
*Attorney*—Harry R. Lubcke

[57] ABSTRACT

A numeric code having human-readable and correlative mark elements. These are impressed upon a medium carrying information to be read by either human or machine inspection. Block numerals with two additional rows of marks are employed, one row being clock pulse marks.

2 Claims, 6 Drawing Figures

Patented May 1, 1973 3,731,276

2 Sheets-Sheet 1

INVENTOR
HARRY F. RAYFIELD
BY Harry R. Lubcke
AGENT

RETRIEVAL CODE

BACKGROUND OF THE INVENTION

This invention pertains to identifying indicia, particularly associated with recorded information, useful in locating and retrieving specific information from amongst numerous items of recorded information.

For a long time the art has placed human-readable indicia for information purposes upon mediums carrying other information; such as numerals upon the edge of a photographic negative or print.

The computer art has more recently placed non-human-readable "marks," actually digital bits, upon photographic film, upon a magnetic tape, drum or disk, upon paper tape, or upon cards, as an address for the location and retrieval of accompanying digital or other information.

Such addressing is accomplished by using various types of digital codes, all of which are readable by machine, but which are generally not directly readable by lay humans as numeric digits without some sort of conversion. Such coding of addresses and ease of reading them is particularly needed where large numbers of documents are processed and the information or images must be located and retrieved quickly and accurately.

BRIEF SUMMARY OF THE INVENTION

Computer read-out apparatus and other computer-like apparatus capable of storing or handling a large amount of information invariably require some sort of address code by which selected information can be located and retrieved. Apparatus which provides human-readable information preferably also has human-readable indicia, to allow location and retrieval by human activity, or a check on the accuracy of the result in critical situations. Usually it is also necessary to provide machine-readable indicia, since such a mode of location and retrieval is also usually employed.

Any means, such as photographic, that is suited to produce a human-readable read-out is also suited for machine operation by the use of photoelectric cells or equivalent opto-electric photo-responsive devices. The code of this invention employs the vertical strokes of block numerals for two series of marks and provides two additional series to make each determination unique. The numerals per se are thus used for both human-readable and machine-readable purposes.

DESCRIPTION OF THE PREFERRED EMBODIMENTS

Figure 1:
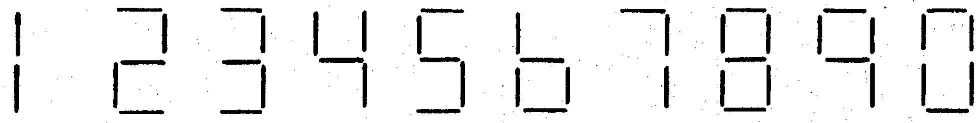
FIG. 1 shows numerals one to zero in block form suitable for use in this invention.

The numeral font of FIG. 1 is easily human-readable. It is easily formed from any display entity having seven related linear marks; four vertical and three horizontal. The font of this code is not restricted to any apparatus, but the known Elfin glow lamp possesses internal electrodes which will illuminate to provide any or all of the seven marks upon suitable selective electrical energization. As shown, and as understandable from the inherent nature of glow lamps, all strokes, vertical and horizontal on the characters, and vertical on the marks, are of equal width and are relatively narrow to give clean, sharp pulses when machine-read. Other fonts having a different number or arrangement of vertical marks can also be used by making corresponding changes in the electrical logic apparatus used to excite illumination of the marks.

Figure 2:
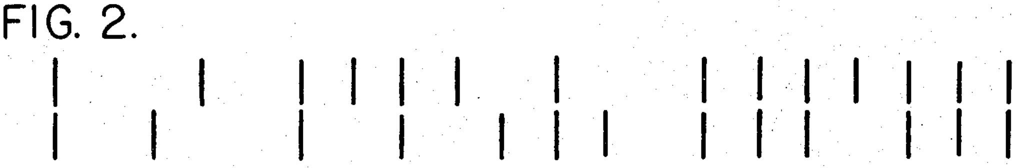
FIG. 2 shows the vertical strokes alone of these numerals; these being aligned vertically with the corresponding numeral of FIG. 1 in each case.

While the code of this invention is not restricted to any apparatus, nevertheless, when such a font as described is moved past two photocells 1 and 2, one to sense the upper half of each numeral and one to sense the lower half, the series of electrical impulses produced corresponds to the vertical marks shown in FIG. 2. The horizontal marks are narrow vertically and are difficult to "read" by means of photocells scanning a moving medium 3 upon which the numerals have been impressed. Accordingly, these can be ignored in machine reading according to this invention.

FIG. 2 shows that when vertical marks alone are employed for recognition indicia, ambiguity exists. The 1 and the 7 have the same set of (two) marks. Similarly, 0 and 8 both have four vertical marks, and 4 and 9 both have three vertical marks.

Figure 3:
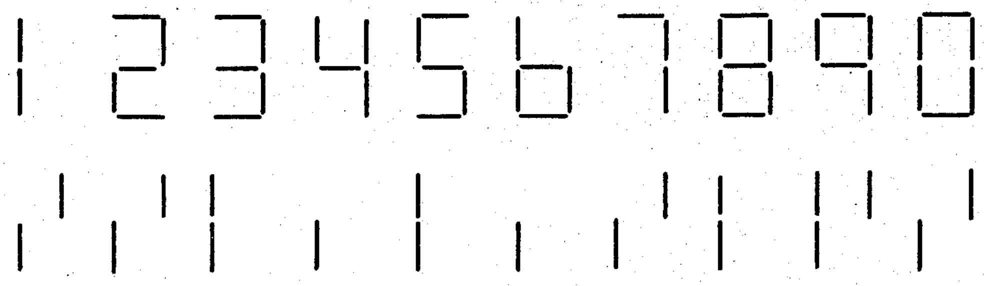
FIG. 3 shows the numerals of FIG. 1 along with a third row of vertical marks to provide uniqueness, and a fourth row of clock pulses to identify the "front" of each character.

By adding two more rows of vertical marks, as shown in FIG. 3, the ambiguity is removed. The third row down consists of marks related to the numeral directly above in each instance. That is, each numeral 1 is accompanied by a mark in the third row in the righthand column associated with the 1, while each numeral 7 is accompanied by a third row mark, also in the right-hand column. However, for the 1, when the medium is moved (as to the left by roller means 4 past a stationary reading device) including additional photo-responsive cells 5 and 6, two impulses are produced at one time and one impulse is produced later. For the 7, three impulses are all produced at the later time.

Similarly, 8 is identified by three impulses produced at one time at the first column of vertical marks, while 0 is identified by three impulses produced at the later time. The 4 is not given an additional mark in the third row, but the 9 is given one in both the right-hand and the left-hand columns.

The fourth or lower row of marks consists of clock pulses defining the start of each numeral, as related to motion to the left of the medium upon which the marks are impressed. These marks are thus uniformly in the left column of each numeral. When included in the count of the three rows above previously described, the uniqueness of each representation of a numeral is further enhanced. A particular function of the clock mark is to identify the "front" of each numeral.

Figure 4:
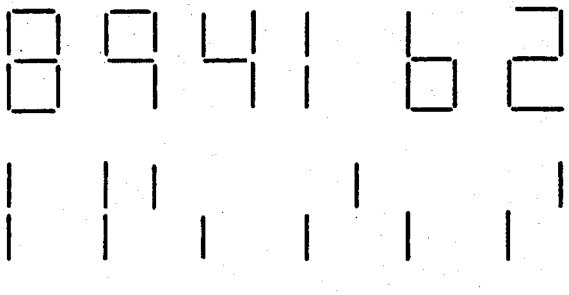
FIG. 4 shows a six digit example of the use of the invention.

An example having six digits selected at random is the 894162 sequence of FIG. 4.

Each numeral (character) is read in two sections; in time, one after the other. The first section is the leading column of marks, identified by the clock pulse (mark). This is followed by the second column which does not have a clock pulse. Note that there is at least one mark in each vertical column and that there is always an even number of marks, including the clock mark, in every numeral. This achieves a high degree of redundancy for reading the numerals. Any error in reading a character is immediately noted when the reading means includes logic to check the sum of all of the marks in a character and the presence of at least one mark in each column. Such detection of errors can be important in high speed searching and reading.

Figure 5:
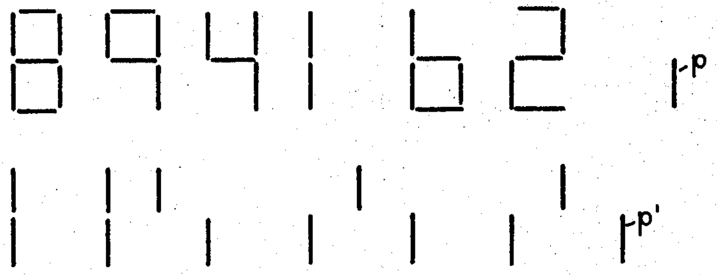
FIG. 5 shows the same example with a parity bit.
Figure 6:
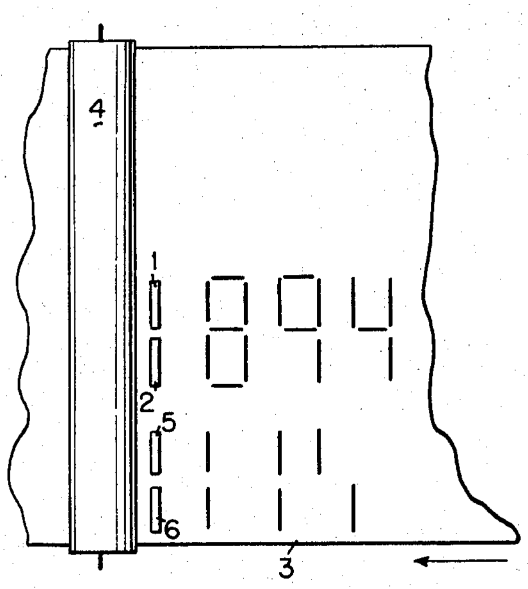
FIG. 6 shows the code, medium and reading means.

If full checking of each sequence is desired, an additional longitudinal parity mark (bit) may be added at the termination of the sequence. This is the last mark p in the lower row of the numerals in FIG. 5, also the last mark p' in the lowest, fourth, row, in addition to the clock impulses. This gives an odd number of marks in each row, without which parity mark rows two and four would be even.

It is possible under those circumstances that the parity character would not have the proper even number of vertical bars and would not be checked for this characteristic. This discrepancy may be obviated by a "count six" circuit employed in the electronics which utilize the machine-read indicia. Such a circuit demands an even mark count in only the first six numerals of an address, and allows a non-even parity mark in the seventh position.

I claim:

1. Information address means comprising;

a. An information-carrying medium (3) with human-readable numeric address characters in a horizontal row, each said character having upper and lower vertical portions, b. said medium additionally having plural horizontal rows of vertical marks individually vertically aligned with the vertical portions of said characters and having the same width, said plural rows of vertical marks being vertically adjacent, one to the other, and parallel to said row of characters, with at least one first said vertical mark vertically aligned with the first vertical portion of the vertically related character, c. plural photo-responsive means (1,2,5,6) positioned to individually intercept one horizontal row of both the vertical portions of the characters and the vertical marks, and d. means (4) to move the medium relative to said photo-responsive means, and because of such movement to give a unique total response from all of said photo-responsive means for each said character and the vertical marks related thereto.

2. The information address means of claim 1 in which ambiguity inherent in the vertical portions of certain characters is removed by;

a. introducing a vertical mark for one of said certain characters for which ambiguity exists at a given horizontal position with respect to that character, and b. introducing a vertical mark for an other of said certain characters for which ambiguity exists at a different horizontal position with respect to that character, such that the configuration of vertical portions and introduced vertical marks for the other character is unique with respect to the configuration of the one character.

* * * * *